United States Patent Office 3,755,374
Patented Aug. 28, 1973

3,755,374
SULPHENYLATED DIHYDROBENZOFURANYL-N-METHYLCARBAMATES
Gerhard Zumach, Cologne, Engelbert Kühle, Bergisch-Gladbach, and Ingeborg Hammann, and Wolfgang Behrenz, Cologne, Germany, assignors to Bayer Aktiengesellschaft, Leverkusen, Germany
No Drawing. Filed Sept. 9, 1971, Ser. No. 179,226
Claims priority, application Germany, Sept. 15, 1970,
P 20 45 441.5
Int. Cl. C07d 5/36
U.S. Cl. 260—346.2 R     8 Claims

ABSTRACT OF THE DISCLOSURE

Sulphenylated dihydrobenzofuranyl - N - methylcarbamates of the general formula

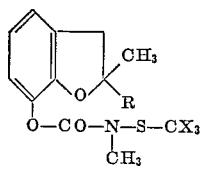

(I)

in which
R is hydrogen or methyl and
X is fluorine, chlorine or bromine,
which possess insecticidal and acaricidal properties.

---

The present invention relates to and has for its objects the provision of the particular new sulphenylated dihydrobenzofuranyl-N-methylcarbamates, i.e. 2-methyl- or 2,2 - dimethyl - 2,3 - dihydrobenzofuran(7)yl-N-(trihalomethylmercapto)-N-methyl-carbamates, which possess insecticidal and acaricidal properties, active compositions in the form of mixtures of such compounds with solid and liquid dispersible carrier vehicles, and methods for producing such compounds and for using such compounds in a new way especially for combating pests, e.g. insects and acarids, with other and further objects becoming apparent from a study of the within specification and accompanying examples.

It is known from German published specification 1,493,646 that various dihydrobenzofuranylcarbamates exhibit insecticidal activity.

The present invention provides N-sulphenylated dihydrobenzofuranyl-N-methyl-carbamates of the general formula

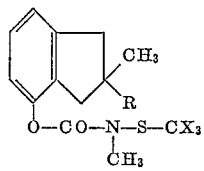

(I)

in which
R is hydrogen or methyl and
X is fluorine, chlorine or bromine.

These compounds are suprisingly distinguished by stronger insecticidal and acaricidal properties than the previously known dihydrobenzofuranylcarbamates and therefore represent a valuable contribution to the art.

The invention also provides a process for the production of sulphenylated dihydrobenzofuranyl - N-methylcarbamates of the Formula I in which
(a) An N-sulphenylated N-methylcarbamic acid fluoride of the general formula

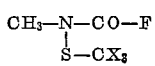

(II)

is reacted with a dihydrobenzofuranol of the general formula

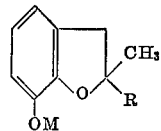

(III)

or (b) A dihydrobenzofuranol-N-methylcarbamic acid ester of the general formula

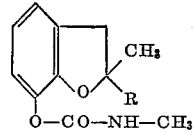

(IV)

is reacted with a sulphenyl chloride of the general formula $$X_3C-S-Cl$$     (V)

in which Formula R and X have the same meanings as in Formula I and M is hydrogen or an alkali metal.

The above reactions may be carried out in the presence of a diluent and/or an acid acceptor.

If 2,2-dimethyl-7-hydroxy-2,3-dihydrobenzofuran and N-(fluorodichloromethylthio)-N-methylcarbamic acid fluoride are used as starting materials, the reaction course according to process variant (a) can be represented by the following formula scheme:

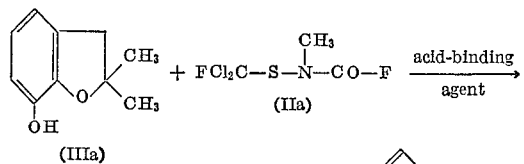

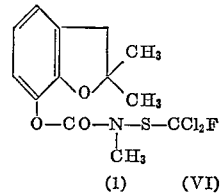

(1)     (VI)

If 2,2-dimethyl - 2,3 - dihydrobenzofuranyl-7-N-methylcarbamate and difluorochlormethanesulphenyl chloride are used as starting materials, the reaction according to process variant (b) proceeds as follows:

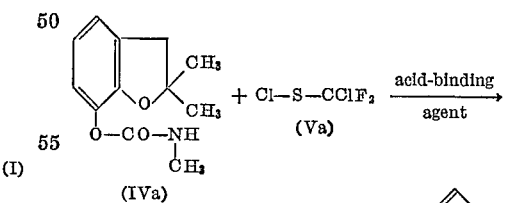

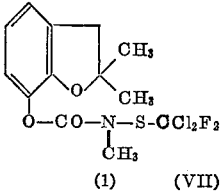

(1)     (VII)

The dihydrobenzofuranyl derivatives and the N-sulphenylated N-methylcarbamic acid fluorides to be used for the reactions are known compounds. The starting compounds (II) can be made from N-methylcarbamic acid fluoride and the appropriate, known sulphenyl chlorides of the Formula V in the presence of a tertiary amine, as described in Belgian patent specification 717,705.

The preparation of the new substances takes place preferably in the presence of a solvent or diluent. When working with solvents, those are preferably used which react only slowly, or preferably not at all, with the N-sulphenylated N-methylcarbamic acid fluorides or the sulphenyl chlorides. As such solvents, there are mentioned for example: optionally chlorinated hydrocarbons, such as benzene, toluene, methylene chloride, dichloroethane, chloroform, chlorobenzene, dichlorobenzene; ethers, such as diethyl ether, tetrahydrofurane, dioxane; dialkylamides, such as dimethyl formamide, and mixtures of the said solvents.

In order to bind the hydrogen fluoride or hydrogen chloride formed in the reaction, there is added to the reaction mixture an acid acceptor, preferably a tertiary base, such as triethylamine, or inorganic bases such as alkali metal hydroxides or alkali metal carbonates. When N-sulphenylated N-methylcarbamic acid fluorides are used according to process variant (a), it is, instead, also possible to start directly from the appropriate alkali metal dihydrobenzofuranolates and to carry out the reaction in aqueous phase.

The reaction temperatures can be varied within a fairly wide range. In general, the reaction is carried out at about 0 to 100° C., preferably at about 20 to 40° C.

Usually, the reactants are used in approximately equimolar proportions.

The working up of the reaction mixture may take place in customary manner.

The active compounds according to the invention exhibit strong insecticidal and acaricidal properties, with low phytotoxicity. The active compounds can therefore be used with good results for the control of noxious sucking and biting insects, Diptera and mites (Acarina). The compounds furthermore exhibit a strong activity against mould fungi.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas such as *Euscedlis bilobatus* and *Nephotettix bipunctatus*; and the like.

In the case of the biting insects contemplated herein, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*); and the like.

Also to be classed with the biting insects contemplated herein are beetles (Coleoptera), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra or Sitrophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blatella germanica*), American cockroach (*Periplaneta americana*), Madeira cockroach (*Leucophaea or Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the estern subterranean (*Reticulitermes flavipes*) and Hymenoptera such as ants, for example the garden ant (*Lasius niger*); and the like.

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles sephensi*) and the like.

With the mites (Acari) contemplated herein there are classed, in particular, the spider mites (Tetranychidae) such as the two-spotted spider mite (*Tetranychus telarius=Tetranychus althaea* or *Tetranychus urticae*) and the European red mite (*Paratetranychus pilosus=Panonychus ulmi*), gall mites, for example the black current gall mite (*Eriophyes ribis*) and tarsonemids, for example the broad mite (*Hemitarsonemus latus*) and the cylamen mite (*Tarsonemus pallidus*); finally, ticks, such as the relapsing fever tick (*Ornithodorus moubata*); and the like.

When applied against hygiene pests and pests of stored products, particularly flies and mosquitoes, the process products are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, etc.), halogenated, especailly chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethylformamide, etc.), sulfoxides (e.g. dimethylsulfoxides, etc.), ketones (e.g. acetone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or fungicides, bactericides, nematocides, rodenticides, herbicides, fertilizers, growth-regulating agents, etc., if desired, or in the form of particular dosage preparations for specific application made therefrom, such as solutions, emulsions, suspensions, powders, pastes and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions which said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects or acarids, which comprises applying to at least one of correspondingly (a) such insects, (b) such acarids, and (c) the corresponding habitat thereof, i.e. the locus to be protected, a correspondingly combative or toxic amount, i.e. an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vericle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Drosophila test:
Solvent: 3 parts by weight dimethyl formamide
Emulsifier: 1 part by weight alkylarylpolyglycol ether To produce a suitable preparation of active compound, 1 part by weight of the active compound is mixed with the stated amount of solvent containing the stated amount of emulsifier, and the concentrate is diluted with water to the desired concentration.

1 cc. of the preparation of the active compound is applied with a pipette to a filter paper disc of 7 cm. diameter. The wet disc is placed in a glass vessel containing 50 vinegar flies (*Drosophial melanogaster*) and covered with a glass plate.

After the specified periods of time, the destruction is determined as a percentage: 100% means that all the flies are killed; 0% means that none of the flies are killed.

The active compounds, their concentrations, the evaluation times and the degree of destruction can be seen from Table 1.

TABLE 1
(Drosophila test)

| Active compound | Concentration of active compound in percent | Degree of destruction in percent after 1 day |
|---|---|---|
| (A) 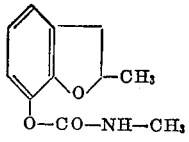 (known) | 0.2<br>0.02<br>0.002 | 100<br>60<br>0 |
| (2) 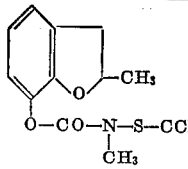 | 0.2<br>0.02<br>0.002 | 100<br>100<br>40 |
| (B) 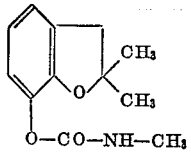 (known) | 0.2<br>0.02<br>0.002 | 100<br>100<br>0 |
| (1) 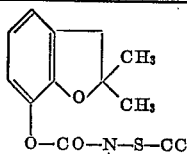 | 0.2<br>0.02<br>0.002 | 100<br>100<br>100 |

TABLE 1—Continued

| Active compound | Concentration of active compound in percent | Degree of destruction in percent after 1 day |
|---|---|---|
| (3) 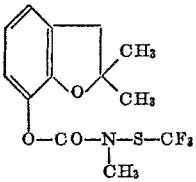 | 0.2<br>0.02<br>0.002<br>0.0002<br>0.00002 | 100<br>100<br>100<br>100<br>50 |
| (4) 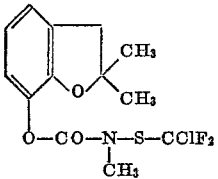 | 0.2<br>0.02<br>0.002<br>0.0002<br>0.00002 | 100<br>100<br>100<br>100<br>60 |

EXAMPLE 2

Myzus test (contact action):
  Solvent: 3 parts by weight dimethyl formamide
  Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentration of the active compounds, the evaluation times and the results can be seen from the following Table 2.

TABLE 2
(Myzus test)

| Active compound | Concentration of active compound in percent | Degree of destruction in percent after 1 day |
|---|---|---|
| (A) 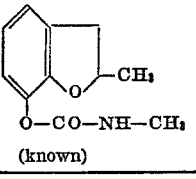<br>(known) | 0.2<br>0.02<br>0.002 | 100<br>99<br>70 |
| (2) 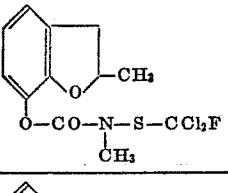 | 0.2<br>0.02<br>0.002 | 100<br>100<br>99 |
| (B) 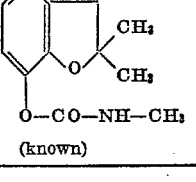<br>(known) | 0.2<br>0.02<br>0.002<br>0.0002 | 100<br>100<br>95<br>25 |

TABLE 2—Continued

| Active compound | Concentration of active compound in percent | Degree of destruction in percent after 1 day |
|---|---|---|
| (1) 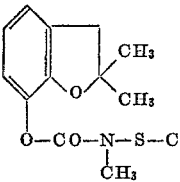 | 0.2<br>0.02<br>0.002<br>0.0002 | 100<br>100<br>100<br>60 |
| (4) 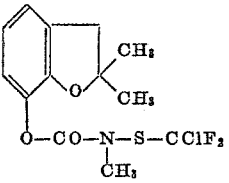 | 0.2<br>0.02<br>0.002<br>0.0002 | 100<br>100<br>95<br>80 |

EXAMPLE 3

Doralis test (systemic action):
  Solvent: 3 parts by weight dimethyl formamide
  Emulsifier: 1 part by weight alkylarylpolyglycol ether To produce a suitable preparation of active compound, 1 part by weight of the active compound is mixed with the stated amount of solvent containing the stated amount of emulsifier, and the concentrate is diluted with water to the desired concentration.

Bean plants (*Vicia faba*) which have been heavily infested with the bean aphid (*Doralis fabae*) are watered with the preparation of the active compound so that the preparation of active compound penetrates into the soil without wetting the leaves of the bean plants. The active compound is taken up by the bean plants from the soil and thus reaches the infested leaves.

After the specified period of time, the degree of destruction is determined as a percentage. 100% means that all the aphids are killed; 0% means that none of the aphids are killed.

The active compounds, the concentrations of the active compounds, the evaluation time and the results can be seen from the following Table 3.

TABLE 3
(Doralis test/systemic action)

| Active compound | Concentration of active compound in percent | Degree of destruction in percent after 4 days |
|---|---|---|
| (A) 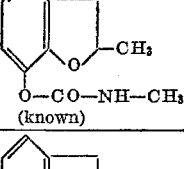<br>(known) | 0.2<br>0.02<br>0.002 | 100<br>100<br>0 |
| (5) 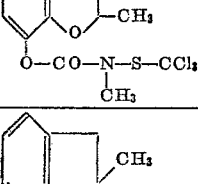 | 0.2<br>0.02<br>0.002 | 100<br>100<br>60 |
| (B) 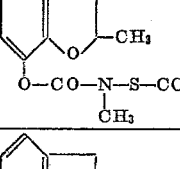<br>(known) | 0.2<br>0.02<br>0.002<br>0.0002 | 100<br>100<br>100<br>20 |

TABLE 3—Continued

| Active compound | Concentration of active compound in percent | Degree of destruction in percent after 4 days |
|---|---|---|
| (3) benzofuran-CH₃,CH₃ with O—CO—N(CH₃)—S—CF₃ | 0.2<br>0.02<br>0.002<br>0.0002 | 100<br>100<br>100<br>90 |
| (4) benzofuran-CH₃,CH₃ with O—CO—N(CH₃)—S—CClF₂ | 0.2<br>0.02<br>0.002<br>0.0002 | 100<br>100<br>100<br>65 |

EXAMPLE 4

Tetranychus test:
Solvent: 3 parts by weight dimethyl formamide
Emulsifier: 1 part by weight alkylaryl polyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from Table 4.

TABLE 4
(Tetranychus test)

| Active compound | Concentration of active compound in percent | Degree of destruction in percent after 2 days |
|---|---|---|
| (A) benzofuran-CH₃ with O—CO—NH—CH₃ (known) | 0.2 | 0 |
| (1) benzofuran-CH₃ with O—CO—N(CH₃)—S—CCl₂F | 0.2<br>0.02 | 98<br>95 |
| (B) benzofuran-CH₃,CH₃ with O—CO—NH—CH₃ (known) | 0.2<br>0.02 | 30<br>0 |
| (2) benzofuran-CH₃,CH₃ with O—CO—N(CH₃)—S—CCl₂F | 0.2<br>0.02 | 100<br>95 |
| (4) benzofuran-CH₃,CH₃ with O—CO—N(CH₃)—S—CClF₂ | 0.2 | 100 |
| (3) benzofuran-CH₃,CH₃ with O—CO—N(CH₃)—S—CF₃ | 0.2 | 100 |

EXAMPLE 5

LD₁₀₀ test:
Test insects: *Tribolium confusum*
Solvent: acetone 2 parts by weight of the active compound are dissolved in 100 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. 25 test insects are then placed in the Petri dish and it is covered with a glass lid.

The condition of the test insects is observed 3 days after the commencement of the experiments. The destruction is determined as a percentage.

The active compounds, the concentrations of the active compounds, the test insects and the results can be seen from the following Table 5.

TABLE 5
(LD₁₀₀ test)

| Active Compound | Concentrations of the solution in percent | Degree of destruction in percent |
|---|---|---|
| (A) benzofuran-CH₃ with O—CO—NH—CH₃ (known) | 0.2<br>0.04<br>0.008 | 100<br>100<br>30 |
| (5) benzofuran-CH₃ with O—CO—N(CH₃)—S—CCl₃ | 0.2<br>0.04<br>0.008<br>0.0016 | 100<br>100<br>100<br>50 |

EXAMPLE 6

Mosquito larvae test:
 Test insects: *Aedes aegypti*
 Solvent: 99 parts by weight acetone
 Emulsifier: 1 part by weight benzylhydroxydiphenyl polyglycol ether To produce a suitable preparation of active compound, 2 parts by weight of the active compound are dissolved in 1000 parts by volume of the solvent containing the amount of emulsifier stated above. The solution thus obtained is diluted with water to the desired lower concentrations.

The aqueous preparations of the active compounds are placed in glass vessels and about 25 mosquito larvae are then placed in each glass vessel.

After 24 hours, the degree of destruction is determined as a percentage. 100% means that all the larvae are killed. 0% means that no larvae at all are killed.

The active compounds, the concentrations of the active compounds, the test insects and the results can be seen from Table 6.

TABLE 6
(Mosquito larvae test)

| Active compound | Concentration of active compound of the solution in percent | Degree of destruction in percent |
|---|---|---|
| (A) 2,3-dihydro-2-methylbenzofuran-7-yl methylcarbamate (known) | 1<br>0.1 | 100<br>30 |
| (B) 2,2-dimethyl-2,3-dihydrobenzofuran-7-yl methylcarbamate (known) | 1<br>0.1 | 100<br>40 |
| (1) 2-methyl-2,3-dihydrobenzofuran-7-yl N-methyl-N-(fluorodichloromethylmercapto)carbamate | 1<br>0.1<br>0.01<br>0.001 | 100<br>100<br>100<br>0 |
| (2) 2,2-dimethyl-2,3-dihydrobenzofuran-7-yl N-methyl-N-(fluorodichloromethylmercapto)carbamate | 1<br>0.1<br>0.01<br>0.001 | 100<br>100<br>100<br>80 |

EXAMPLE 7

$Lt_{100}$ test for Dipteria:
 Test insects: *Triatoma infestans*/3rd nymphal stage
 Solvent: acetone 2 parts by weight of active compound are dissolved in 1000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 10 test insects are then placed in the Petri dish and it is covered with a glass lid.

The condition of the test insects is periodically observed. The time which is necessary for a 100% destruction is determined.

The test insects the active compounds, the concentrations of the active compounds and the periods of time at which there is a 100% destruction can be seen from the following Table 7.

TABLE 7
($LT_{100}$ test for Diptera)

| Active compound | Concentration of active compound of the solution in percent | $LT_{100}$ |
|---|---|---|
| (A) ... (known) | 0.2<br>0.02 | 150′<br>5ʰ |
| (B) ... (known) | 0.2<br>0.02 | 150′<br>210′ |
| (1) ... | 0.2<br>0.02 | 75′<br>180′ |
| (2) ... | 0.2<br>0.02 | 30′<br>90′ |

The process for preparing the novel compounds are illustrated in the following examples.

EXAMPLE 8

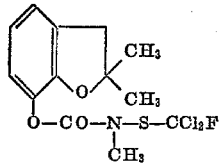

16 g. of 2,2-dimethyl-7-hydroxy-2,3-dihydrobenzofuran (0.1 mole) and 21 g. of N-(fluorodichloromethylmercapto)-N-methylcarbamic acid fluoride (0.1 mole) are dissolved in 150 ml. of ether. To the solution 10 g. of triethylamine are added dropwise at room temperature, the temperature being kept at 30° C. The mixture is stirred for 1 hour at room temperature and it is then washed with water. After drying of the solution and evaporation of the ether, there are obtained by distillation 28 g. of 2,2-dimethyl - 2,3 - dihydrobenzofuran(7)yl-N-(fluorodichloromethylmercapto)-N-methylcarbamate of B.P. 151–153° C./0.18 mm. Hg as yellowish-colored, crystallizing oil of the melting point 66° C. (from petroleum ether).

*Analysis.*—Calcd. (percent): C, 41.1; H, 4.0; Cl, 20.0; N, 4.0; O, 13.6. Found (percent): C, 44.8; H, 4.2; Cl, 20.0; N, 3.9; O, 13.6.

EXAMPLE 9

In analogous manner, the following compounds are obtained:

(6) 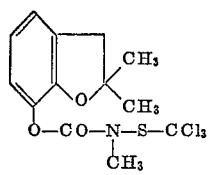 M.P. 86–87° C.

(4) 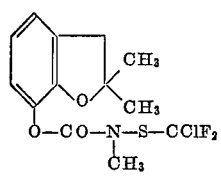 B.P. 142–144° C./ 0.1 mm. Hg (3) 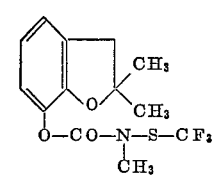 B.P. 102–103° C./ 0.14 mm. Hg (5) 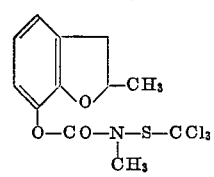 M.P. 78–79° C.

(1) 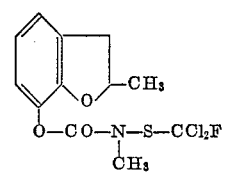 B.P. 152–155° C./ 0.15 mm. Hg

EXAMPLE 10

To a mixture of 22 g. of 2,2-dimethyl-2,3-dihydrobenzofuranyl-7-N-methylcarbamate (0.10 mole), 9 g. of pyridine (0.11 mole) and 100 ml. of dimethyl formamide, there are added dropwise, at room temperature, 17 g. of chlorodifluoromethanesulphenyl chloride (0.11 mole). The reaction mixture is afterwards stirred for 2 hours at room temperature, then poured into water, the oil obtained is taken up in toluene, the toluene solution is washed with water, dried, and evaporated under reduced pressure. After distillation of the residue, there is obtained 2,2-dimethyl - 2,3 - dihydrobenzofuran(7)yl-N-(difluorochloromethylmercapto)-N-methyl-carbamate (Compound 4).

It will be appreciated that the instant specification and examples are set forth by way of illustration and not limitation, and that various modifications and changes may be made without departing from the spirit and scope of the present invention.

What is claimed is:

1. An N-sulphenylated dihydrobenzofuranyl-N-methyl carbamate of the formula:

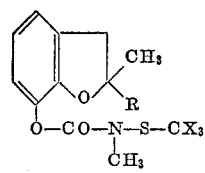 (I)

in which

R is hydrogen or methyl, and
X is fluorine, chlorine or bromine.

2. A carbamate according to claim 1 wherein R is methyl.

3. A carbamate according to claim 1 wherein such compound is 2,2-dimethyl-2,3-dihydrobenzofuran(7)yl-N-(fluorodichloromethylmercapto)-N-methyl-carbamate of the formula

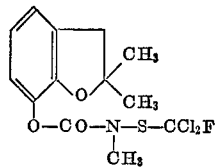 (2)

4. A carbamate according to claim 1 wherein such compound is 2,2-dimethyl-2,3-dihydrobenzofuran(7)yl-N-(trichloromethylmercapto-)N-methyl-carbamate of the formula

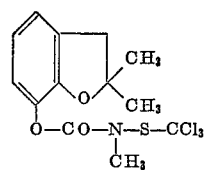 (6)

5. A carbamate according to claim 1 wherein such compound is 2,2-dimethyl-2,3-dihydrobenzofuran(7)yl-N-(difluorochloromethylmercapto-)N-methyl-carbamate of the formula

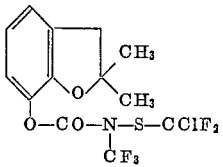 (4)

6. A carbamate according to claim 1 wherein such compound is 2,2-dimethyl-2,3-dihydrobenzofuran(7)yl-N-(trifluoromethylmercapto-)N - methyl - carbamate of the formula

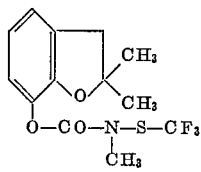 (3)

7. A carbamate according to laim 1 wherein such compound is 2 - methyl-2,3-dihydrobenzofuran(7)yl-N-(trichloromethylmercapto-)N-methyl-carbamate of the formula

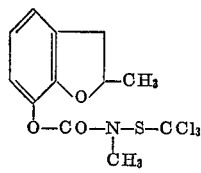 (5)

8. A carbamate according to claim 1 wherein such compound is 2 - methyl-2,3-dihydrobenzofuran(7)yl-N-

(fluorodichloromethylmercapto-)N-methyl-carbamate of the formula
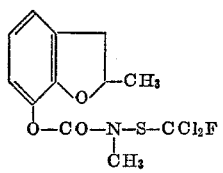
(1)
References Cited
Kuehle et al., Chem. Abstr. (1917), vol. 74, 31082.
ALEX MAZEL, Primary Examiner
B. DENTZ, Assistant Examiner
U.S. Cl. X.R.
429—285